(12) United States Patent
Ogura (10) Patent No.: US 9,531,938 B2
(45) Date of Patent: Dec. 27, 2016

(54) IMAGE-CAPTURING APPARATUS (71) Applicant: Panasonic Corporation, Osaka (JP)

(72) Inventor: Motonori Ogura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 219 days.

(21) Appl. No.: 14/481,965

(22) Filed: Sep. 10, 2014

(65) Prior Publication Data

US 2015/0281553 A1 Oct. 1, 2015

(30) Foreign Application Priority Data

Mar. 28, 2014 (JP) ................. 2014-068189
Aug. 18, 2014 (JP) ................. 2014-165712

(51) Int. Cl.
*H04N 5/232* (2006.01)
*G02B 7/09* (2006.01)

(52) U.S. Cl.
CPC ............ *H04N 5/23212* (2013.01); *G02B 7/09* (2013.01)

(58) Field of Classification Search
CPC .. H04N 5/228; H04N 5/23212; H04N 5/2356; H01J 29/465; H01J 29/54; H01J 29/56; H01J 29/58; H01J 29/70; G03B 13/32; G03B 13/34; G03B 13/36; G03B 3/10; G03B 3/12; G03B 3/00; G03B 3/02; G03B 3/04; G03B 3/06; G03B 13/20; G02B 7/04; G02B 7/09; G02B 7/10; G02B 7/102; G02B 7/105; G02B 7/34; G02B 7/343; G02B 7/346; G02B 7/287; G02B 7/30; G02B 7/305; G02B 7/32; G02B 7/40; G01C 3/00; G01C 3/32; G01C 3/06; G01C 3/08; G01C 3/085; G01S 17/08
See application file for complete search history.

(56) References Cited

U.S. PATENT DOCUMENTS 4,965,840 A * 10/1990 Subbarao ............... G01C 3/085
                                                                            356/12
5,477,302 A    12/1995 Ogasawara
5,576,975 A    11/1996 Sasaki et al.
(Continued)

FOREIGN PATENT DOCUMENTS

JP     2-15214     1/1990
JP     2-163717    6/1990
(Continued)

*Primary Examiner* — Aung S Moe
(74) *Attorney, Agent, or Firm* — Wenderoth, Lind & Ponack, L.L.P.

(57) ABSTRACT

An image-capturing apparatus includes a focus lens that forms an object image of the object, an image sensor that produces image data by capturing the object image, and a controller that controls the focus lens. The focus lens has a focal position. The controller is operable to detect a change of a distance from the image-capturing apparatus to the object during a first exposure period based on image data produced by capturing the object image with the image sensor during the first exposure period. The controller is operable to determine, based on the detected change in the distance, a control amount which controls a moving velocity at which the focal position moves during a second exposure period after the first exposure period. The controller is operable to move the focal position at a moving velocity corresponding to the determined control amount, and cause the image sensor to capture the object image during the second exposure period.

11 Claims, 9 Drawing Sheets

(56) References Cited

U.S. PATENT DOCUMENTS

| | | | |
|---|---|---|---|
| 5,625,434 A | 4/1997 | Iwane | |
| 8,194,995 B2* | 6/2012 | Wong | H04N 5/23212 345/419 |
| 9,100,562 B2* | 8/2015 | Mohan | H04N 5/232 |
| 9,324,153 B2* | 4/2016 | Komatsu | G06T 7/0069 |
| 9,361,680 B2* | 6/2016 | Takahashi | G06T 5/50 |
| 2007/0132861 A1* | 6/2007 | Furuki | G02B 7/28 348/231.3 |
| 2008/0013941 A1* | 1/2008 | Daley | G06T 5/50 396/121 |
| 2008/0297648 A1 | 12/2008 | Furuki et al. | |
| 2009/0135291 A1 | 5/2009 | Sugimoto | |
| 2009/0148146 A1 | 6/2009 | Maeda | |
| 2010/0033677 A1* | 2/2010 | Jelinek | G06K 9/00604 351/208 |
| 2011/0044675 A1 | 2/2011 | Uenishi | |
| 2012/0154668 A1* | 6/2012 | Kimura | G01C 3/32 348/348 |
| 2012/0218461 A1 | 8/2012 | Sugimoto | |
| 2012/0281132 A1* | 11/2012 | Ogura | H04N 5/23212 348/348 |
| 2012/0300114 A1* | 11/2012 | Isogai | G01S 17/46 348/345 |
| 2013/0113984 A1* | 5/2013 | Shimamoto | G03B 13/32 348/345 |
| 2013/0308005 A1* | 11/2013 | Takahashi | H04N 5/23212 348/222.1 |
| 2013/0308038 A1* | 11/2013 | Miyajima | G02B 7/34 348/345 |
| 2013/0335614 A1 | 12/2013 | Ichimiya | |
| 2014/0146219 A1* | 5/2014 | Kawamura | H04N 5/23212 348/349 |
| 2014/0184883 A1* | 7/2014 | Shimamoto | G03B 3/00 348/345 |
| 2014/0211045 A1* | 7/2014 | Tanaka | H04N 5/23212 348/239 |
| 2014/0293116 A1* | 10/2014 | Okamoto | G03B 13/36 348/349 |
| 2014/0375872 A1 | 12/2014 | Honjo et al. | |
| 2015/0138429 A1* | 5/2015 | Ogura | H04N 5/23212 348/349 |
| 2015/0138430 A1* | 5/2015 | Ogura | H04N 5/2328 348/349 |
| 2015/0146033 A1* | 5/2015 | Yasugi | H04N 5/353 348/222.1 |
| 2015/0147042 A1* | 5/2015 | Miyahara | G11B 27/005 386/224 |
| 2015/0222808 A1* | 8/2015 | Nguyen | H04N 5/23212 348/349 |
| 2015/0271475 A1* | 9/2015 | Shibuno | H04N 5/23212 348/46 |
| 2015/0281552 A1* | 10/2015 | Ogura | H04N 5/23212 348/349 |
| 2015/0281554 A1* | 10/2015 | Ogura | H04N 5/23293 348/333.11 |

FOREIGN PATENT DOCUMENTS

| | | |
|---|---|---|
| JP | 5-107455 | 4/1993 |
| JP | 5-313059 | 11/1993 |
| JP | 8-68934 | 3/1996 |
| JP | 2646749 B | 5/1997 |
| JP | 3110095 | 11/2000 |
| JP | 2005-215373 | 8/2005 |
| JP | 2007-139893 | 6/2007 |
| JP | 2008-52225 | 3/2008 |
| JP | 2009-133903 | 6/2009 |
| JP | 2009-139688 | 6/2009 |
| JP | 2010-177741 | 8/2010 |
| JP | 2011-015163 | 1/2011 |
| JP | 2011-039454 | 2/2011 |
| JP | 2013-044844 | 3/2013 |
| JP | 2013-134411 | 7/2013 |
| JP | 2014-2283 | 1/2014 |
| JP | 2014-2370 | 1/2014 |
| JP | 2014-145867 | 8/2014 |
| WO | 2013/136815 | 9/2013 |

* cited by examiner

IMAGE-CAPTURING APPARATUS

TECHNICAL FIELD

The present invention relates to an image-capturing apparatus.

BACKGROUND ART

Japanese Patent Laid-Open Publication No. 2011-15163 discloses an image-capturing apparatus that employs a system of depth From Defocus (DFD) method. This image-capturing apparatus implements a focus control that obtains plural defocusing, and includes an image-capturing device for capturing plural images defocusing differently from each other. The image-capturing apparatus then determine an object distance based on the plural images defocusing differently from each other. The image-capturing apparatus performs the focus control based on the determined object distance.

SUMMARY

An image-capturing apparatus includes a focus lens that forms an object image of the object, an image sensor that produces image data by capturing the object image, and a controller that controls the focus lens. The focus lens has a focal position. The controller is operable to detect a change of a distance from the image-capturing apparatus to the object during a first exposure period based on image data produced by capturing the object image with the image sensor during the first exposure period. The controller is operable to determine, based on the detected change in the distance, a control amount which controls a moving velocity at which the focal position moves during a second exposure period after the first exposure period. The controller is operable to move the focal position at a moving velocity corresponding to the determined control amount, and cause the image sensor to capture the object image during the second exposure period.

This image-capturing apparatus provides a convenient focusing action based on the distance to the object.

DETAIL DESCRIPTION OF PREFERRED EMBODIMENT

An exemplary embodiment of the present invention will be detailed below with reference to the accompanying drawings. An excessive description is omitted. For instance, a description of a well-known object in a public domain is omitted, or a description of a similar element to that discussed previously is omitted for avoiding redundancy and facilitating an ordinary skilled person in the art to understand the present invention.

The inventor(s) provides the accompanying drawings and the description for the ordinary skilled person in the art to fully understand the disclosure, so that these materials may not limit the scope of the claims.

A number of methods for measuring an object distance, a distance from an image-capturing apparatus to an object includes a depth from Defocus (DFD) method that utilizes correlation values of defocusing amounts generated in image captured with a camera. In general, a defocusing amount is uniquely determined for each image-capturing apparatus in response to a relation between a focal position and the object distance. In the DFD method utilizing the above characteristics, two images having different defocusing amounts are produced, and the object distance is measured based on a point-spread function (PSF) and a difference in the defocusing amounts. The image-capturing apparatus in accordance with this embodiment measures the object distance by utilizing the DFD calculation to perform an auto-focus control.

A structure and operation of the image-capturing apparatus in accordance with the embodiment will be described below.

1. Electrical Structure of Image-Capturing Apparatus

Figure 1:
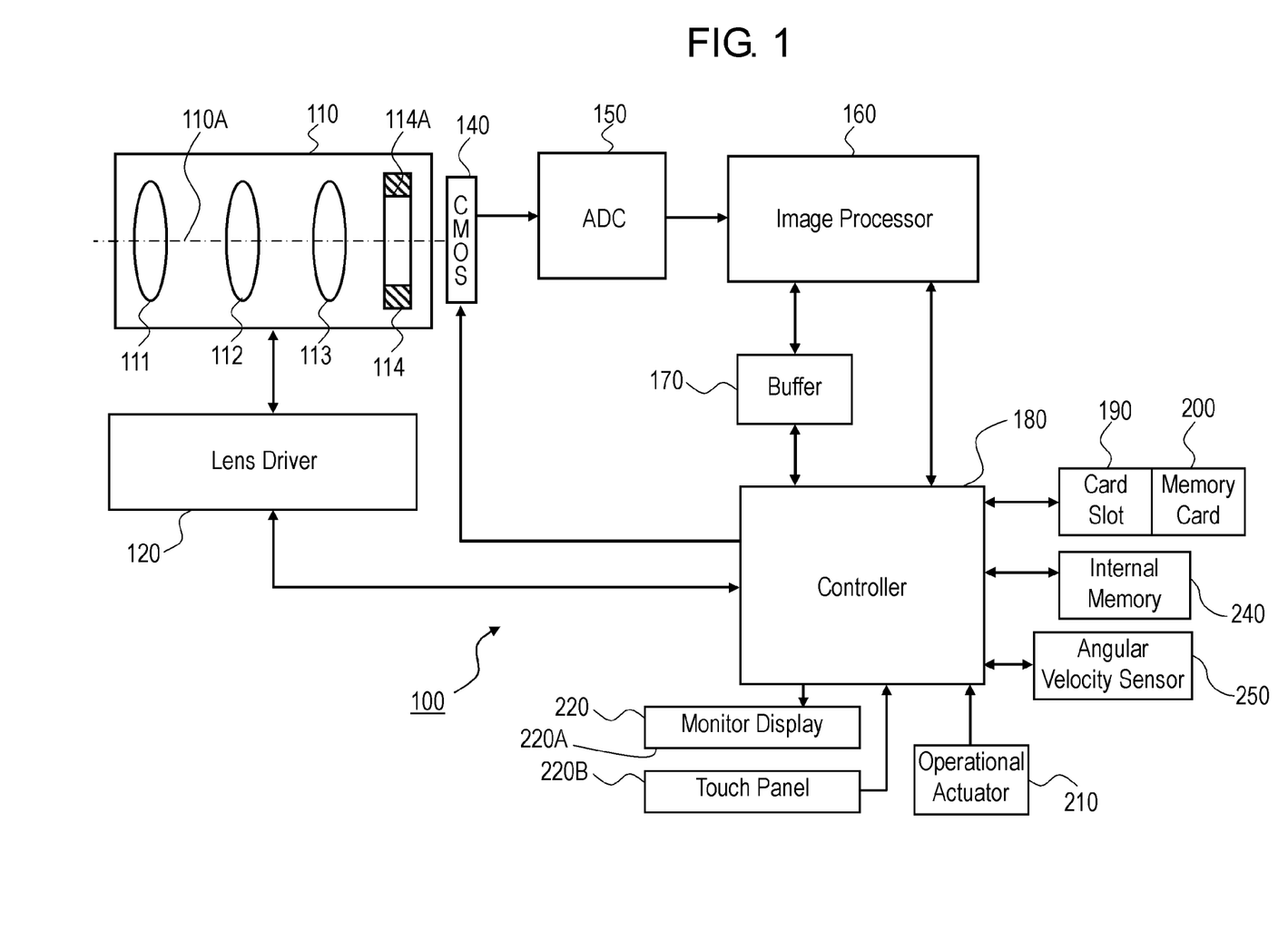
FIG. 1 is a block diagram of a digital video camera in accordance with an exemplary embodiment for illustrating an electrical structure of the digital video camera.

FIG. 1 is a block diagram of digital video camera 100, an image-capturing apparatus in accordance with the embodiment, for illustrating an electrical structure of digital video camera 100. Digital video camera 100 includes optical system 110 including at least one lens. Optical system 110 forms an object image on CMOS image sensor 140 by utilizing light from an object. The object image is captured with an image sensor, CMOS image sensor 140. CMOS image sensor 140 produces image data based on the captured object image. The image data produced by CMOS image sensor 140 is converted into a digital signal with ADC 150, and processed with image processor 160. The digital signal is stored in memory card 200. The structure of digital video camera 100 will be detailed below.

Optical system 110 in accordance with the embodiment includes zoom lens 111, camera-shake correcting lens 112, focus lens 113, and iris 114. Zoom lens 111 moves along optical axis 110A to enlarge and reduce the object image. Focus lens 113 moves along optical axis 110A to adjust a focus of the object image. Camera-shake correcting lens 112 is movable within a plane perpendicular to optical axis 110A of optical system 110. Camera-shake correcting lens 112 moves along a direction in which a shake of digital video camera 100 is cancelled as to reduce an influence caused by the shake of camera 100 on the captured image. Iris 114 has opening 114A therein disposed on optical axis 110A, and adjusts the size of opening 114A automatically or according to a user's setting, so that iris 114 can adjust an amount of light transmitting through iris 114.

Lens driver 120 includes a zoom actuator that drives zoom lens 111, a camera-shake correcting actuator that drives camera-shake correcting lens 112, a focus actuator that drives focus lens 113, and an iris actuator that drives iris 114. Lens driver 120 controls the zoom actuator, the camera-shake correcting actuator, the focus actuator, and the iris actuator.

CMOS image sensor 140 captures the object image formed by optical system 110, and produces analog image data in form of an analog signal. Image sensor 140 performs various operations, such as exposure, transfer, and electronic shutter.

A/D converter 150 converts the analog image data produced by CMOS image sensor 140 into digital image data in form of a digital signal.

Image processor 160 processes the image data produced by CMOS image sensor 140 to produce image data to be displayed on monitor display 220 and to produce image data to be stored in memory card 200. For instance, image processor 160 performs a gamma correction, a white-balance correction, and a flaw correction on the image data produced by CMOS image sensor 140. Image processor 160 compresses the image data produced by CMOS image sensor 140 by a compression method in accordance with H.264 standard or MPEG2 standard. Image processor 160 may be implemented by a DSP or a microprocessor.

Controller 180 controls entire digital video camera 100, and can be implemented by a semiconductor element. Controller 180 can be implemented by hardware, or by a combination of hardware and software. Controlled may be implemented by a microprocessor.

Buffer 170 functions as a working memory of image processor 160 and controller 180, and can be implemented by, e.g. a DRAM or a ferroelectric memory.

Card slot 190 holds memory card 200 detachably, and is mechanically or electrically connectable to memory card 200. Memory card 200 contains a flash memory or a ferroelectric memory therein, and stores data, such as an image file produced in image processor 160.

Internal memory 240 is implemented by a flash memory or a ferroelectric memory, and stores a control program that controls entire digital video camera 100. Internal memory 240 also stores point spread functions (PSFs).

Operational actuator 210 includes user interfaces, such as a cross key, an enter-button, for accepting operations by users.

Monitor display 220 has screen 220A that displays thereon an image indicated by the image data produced by CMOS image sensor 140 and an image indicated by the image data read out from memory card 200. Monitor display 220 displays various menus for setting functions of camera 100 on screen 220A. Touch panel 220B is disposed on screen 220A. Touch panel 220B is touched by a user for receiving various touch actions. An instruction entering through touch panel 220B as a touch action is supplied to controller 180 to be processed.

Angular velocity sensor 250 detects an angular velocity produced in digital video camera 100 due to a camera shake. The angular velocity detected by sensor 250 is supplied to controller 180. Controller 180 drives camera-shake correcting lens 112 to cancel a camera shake produced in digital video camera 100 due to the angular velocity.

2. Operations of Digital Video Camera 100

2-1. Auto-focus Operations Utilizing a Result of the DFD Calculation

Figure 2:
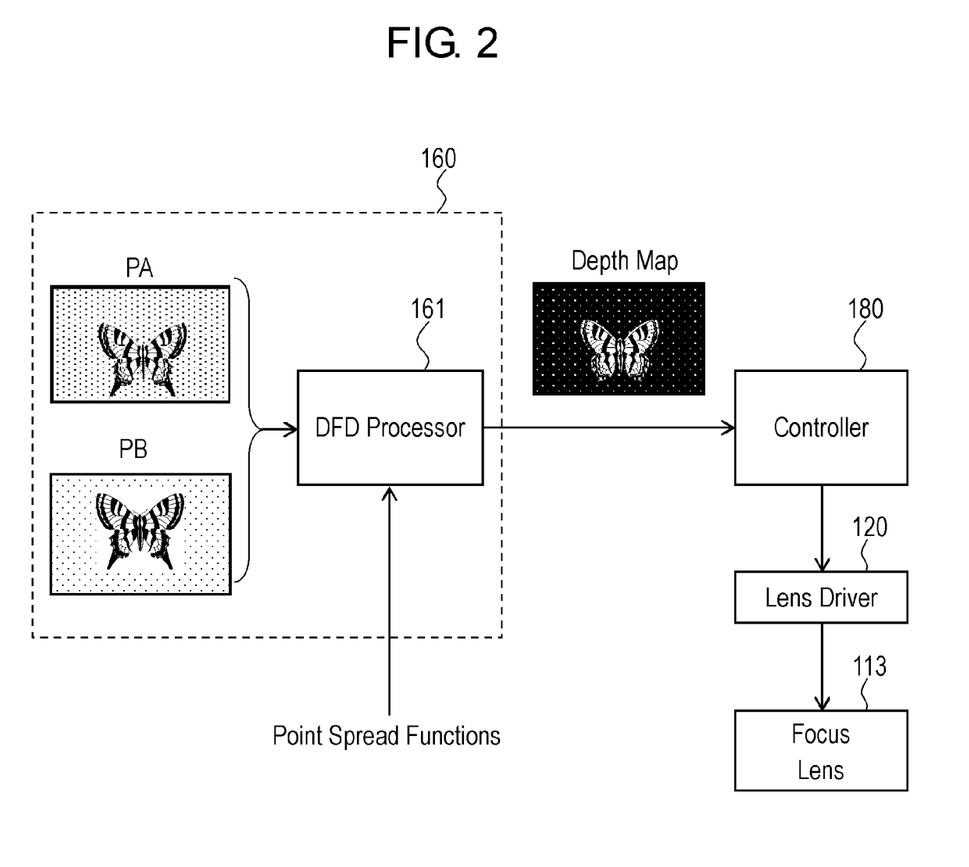
FIG. 2 is a block diagram of the digital video camera in accordance with the embodiment for illustrating an operation of the digital video camera.

Digital video camera 100 performs an auto-focus operation utilizing a result of the DFD calculation. FIG. 2 is a block diagram of digital video camera 100 for illustrating a control of the focus lens by utilizing the result of the DFD calculation.

DFD processor 161 is disposed in image processor 160, and performs the DFD calculation to produce a depth map. To be more specific, DFD processor 161 uses two images: observed image PA and reference image PB having different defocusing amounts produced intentionally by changing focal positions. DFD processor 161 produces the depth map based on observed image PA, reference image PB, and point spread functions (PSFs). The depth map indicates object distances at respective ones of pixels of observed image PA (reference image PB).

Then, DFD processor 161 supplies the depth map to controller 180. Controller 180 controls lens driver 120 as to drive focus lens 113 based on the depth map.

The DFD calculation performed by DFD processor 161 shown in FIG. 2 and the determination of the object distance by controller 180 will be detailed below.

Figure 3:
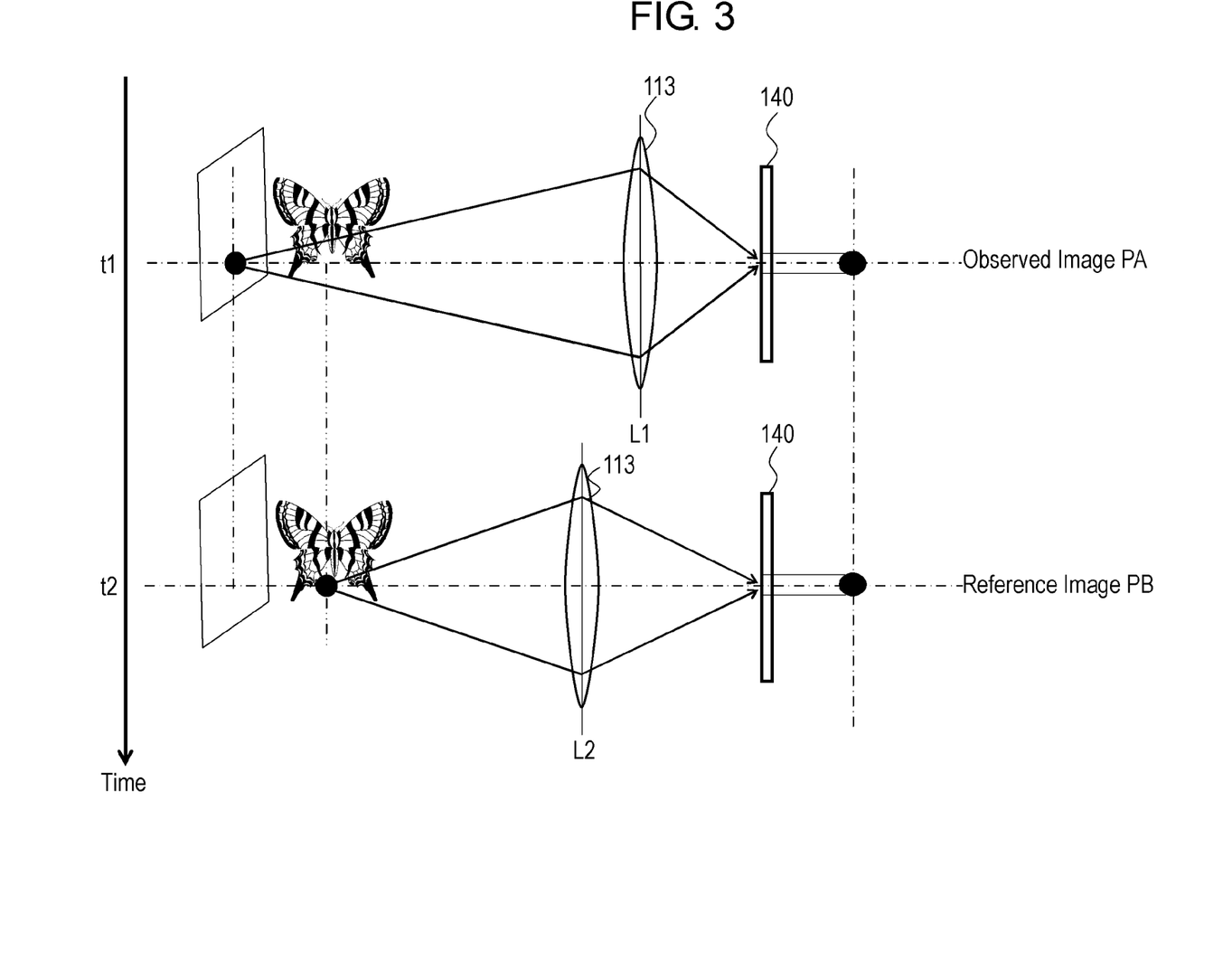
FIG. 3 is a schematic view of the operation of the digital video camera in accordance with the embodiment.

First, the DFD calculation performed by DFD processor 161 will be detailed. FIG. 3 is a schematic view of focus lens 113 of digital video camera 100 in accordance with the embodiment for illustrating the movement of focus lens 113 for the DFD calculation. Controller 180 changes a focal position based on the DFD calculation to intentionally produce two images having different defocusing amounts. To be more specific, as shown in FIG. 3, controller 180 controls lens driver 120 to locate focus lens 113 at focusing position L1 at time point t1. Similarly, focus lens 113 is located at focusing position L2 different from focusing position L1 at time point t2. CMOS image sensor 140 captures an image of the object when focus lens 113 is positioned at focusing position L1 for producing observed image PA. Similarly, image sensor 140 captures the image of the object when focus lens 113 is positioned at focusing position L2 for producing reference image PB. Although being produced by capturing the same object, images PA and PB have defocusing amounts different from each other due to different positions of focus lens 113 for the capturing.

Figure 4:
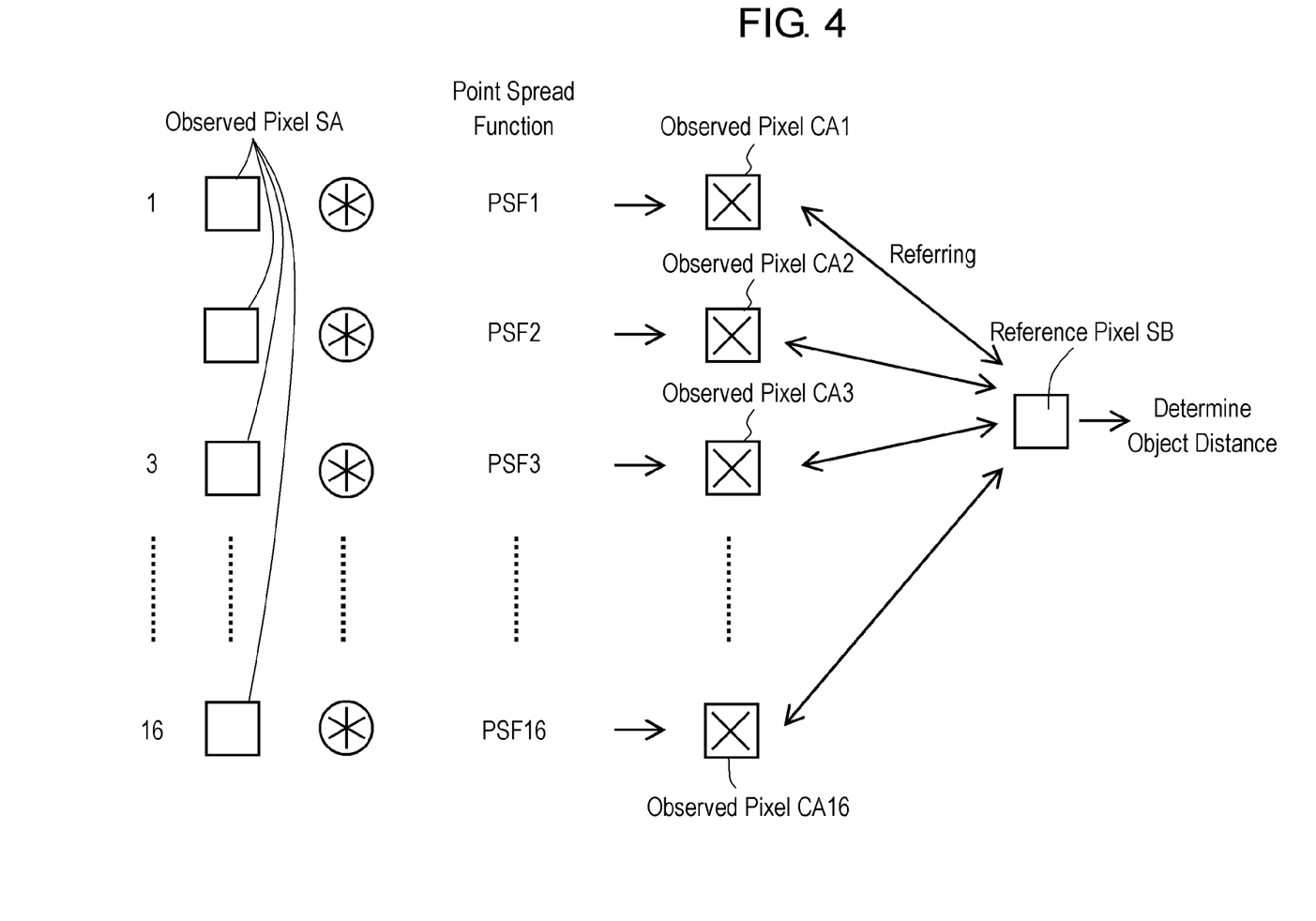
FIG. 4 is a schematic view of a DFD calculation executed by the digital video camera in accordance with the embodiment.

FIG. 4 is a schematic view for illustrating the calculation of the object distance by utilizing the DFD calculation performed by digital video camera 100 in accordance with the embodiment. DFD processor 161 performs the DFD calculation on observed pixels SA constituting observed image PA and reference pixels SB constituting reference image PB to determine the distances from respective ones of pixels SA (SB). DFD processor 161 produces plural observed pixels CA by convolutions of plural PSFs with observed pixels SA. DFD processor 161 compares plural observed pixels CA with reference pixels SB located at the same coordinates as pixels CA on the image. The above operation will be detailed below.

A point spread function (PSF) indicates a response to a point light source of an optical system, and indicates a change in a defocusing amount. A convolution of the PSF with an image corresponding to a combination of point light sources can intentionally produce a defocused image. According to the embodiment, a large number of point spread functions corresponding to a large number of distances to an object are previously provided in internal memory 240. Controller 180 separates distances to an object into sixteen steps, namely from the closest point to the farthest point, and selects sixteen point spread functions PSF1 to PSF16 corresponding to the sixteen steps out of the large number of point spread functions stored in memory 240. Controller 180 then supplies selected point spread functions PSF1 to PSF16 to DFD processor 161.

DFD processor 161 performs convolutions of point spread functions PSF1 to PSF16 with observed pixels SA as to produce sixteen observed pixels CA1 to CA16 corresponding to the object distances at respective ones of observed pixel SA. Since observed pixels CA1 to CA16 have point spread functions different from each other for convolution, observed pixels CA1 to CA16 form different defocused images.

DFD processor 161 then compares observed pixels CA1 to CA16 with reference pixel SB, and selects observed pixel CAn that has the smallest difference from reference pixel SB among observed pixels CA1 to CA16. DFD processor 161 determines the object distance corresponding to the point spread function for convolution producing observed pixel CAn as the distance to the object at observed pixel SA. For instance, if the difference between observed pixel CA3 and reference pixel SB is smaller than differences between reference pixel SB and each of other observed pixels CA1 to CA2, CA4 to CA16, then, DFD processor 161 determines that an object distance corresponding to point spread function PSF3 for convolution with observed pixel SA to produce observed pixel CA3 is the object distance at observed pixel SA. DFD processor 161 outputs distance data corresponding to the determined object distance.

DFD processor 161 performs the above operation on each observed pixels PA and reference pixels PB as to produce a depth map plotting respective object distances at the pixels. According to the embodiment, since sixteen point spread functions corresponding to distances to the object are used, the depth map exhibits sixteens levels of the object distances.

Figure 5:
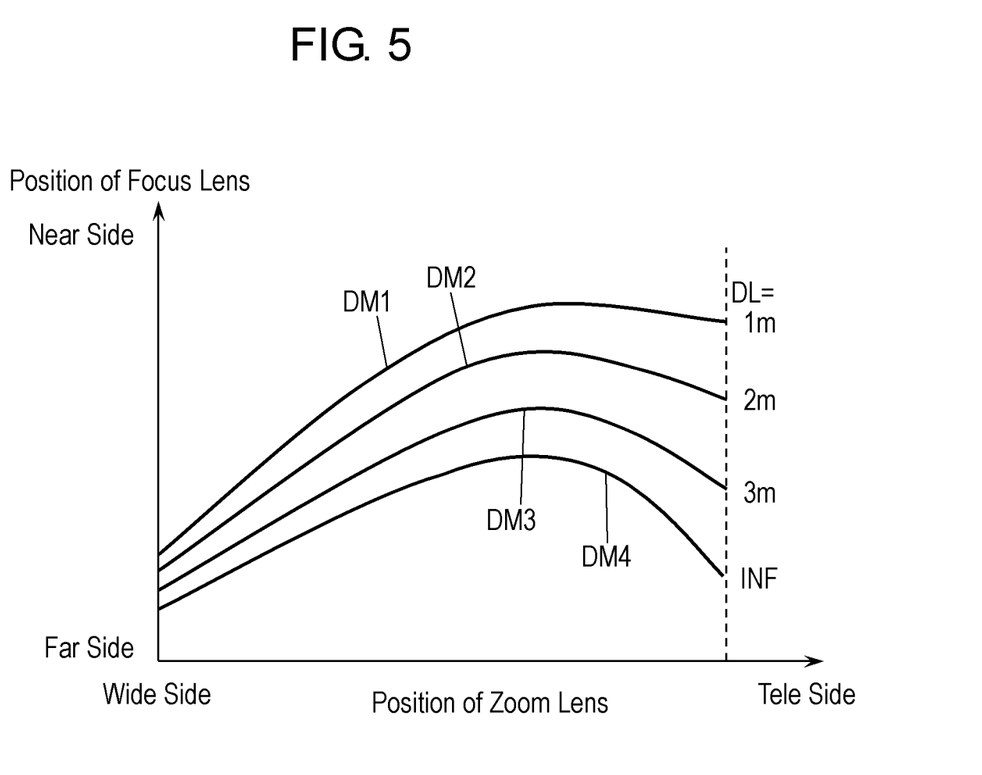
FIG. 5 is a zoom tracking table with respect to distances to plural object distances of the digital video camera in accordance with the embodiment.

Next, based on the object distance determined by the DFD calculation, controller 180 determines a focusing position to which focus lens 113 is to move. To be more specific, controller 180 refers to a tracking table for calculating the focusing position based on the determined object distance as well as a current position of focus lens 111. FIG. 5 is the zoom tracking table for plural object distances of digital video camera 100 in accordance with the embodiment. As shown in FIG. 5, profiles DM1 to DM4 indicate focusing positions corresponding to a position of zoom lens 111 for typical distances DL to an object (1 m, 2 m, 3 m, and infinite shown in FIG. 5). Controller 180 can calculate focusing positions for object distances other than the typical object distances DL by interpolation to the profiles shown in FIG. 5 with respect to the object distances.

Controller 180 determines the focusing position based on the calculated object distance and the zoom tracking table, and controls lens controller 120 to move focus lens 113 to the focusing position as to cause focus lens 113 to focus on the object.

2-2. Control of Focus Lens 113 in Main Exposure

Figure 6A:
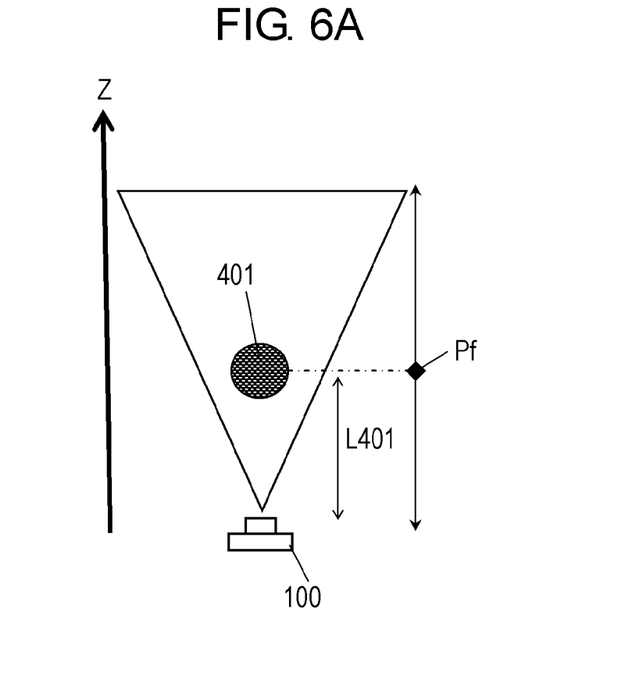
FIGS. 6A and 6B are schematic views of the digital video camera in accordance with the embodiment for illustrating a movement of an object.
Figure 6B:
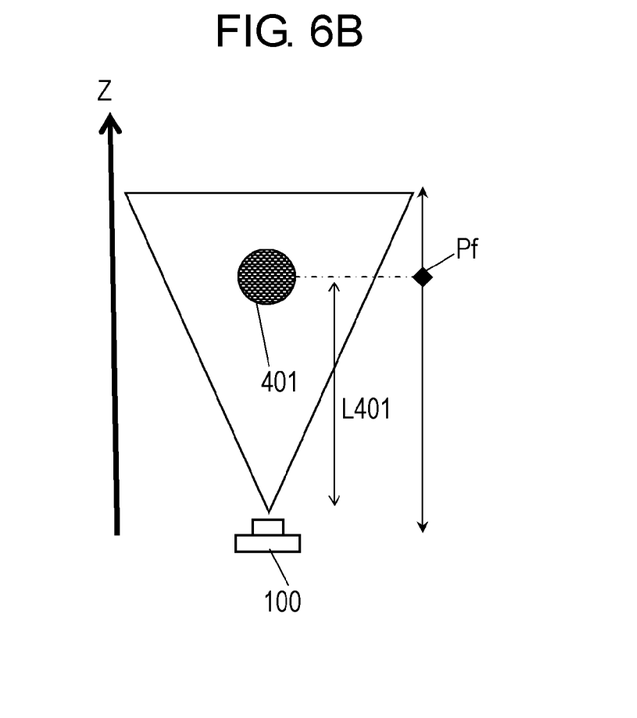

FIGS. 6A and 6B are schematic views of digital video camera 100 in accordance with the embodiment for illustrating a movement of object 401 along the Z-axis. In the description below, as shown in FIGS. 6A and 6B, the Z-axis extends along optical axis 110A of optical system 110, and the direction from digital video camera 100 toward object 401 is defined as a positive direction of the Z-axis. Digital video camera 100 can produce a still image of an object by exposing the object for a predetermined time. First, camera 100 performs a preliminary exposure during a first exposure period, namely, a preliminary exposure period, and then performs a second exposure during a second exposure period, namely, a main exposure period. The preliminary exposure is an exposure operation for capturing an object image of object 401 in order to estimate a moving velocity of object 401 by using the DFD calculation. The main exposure is an exposure operation for capturing the object image of object 401 before finally producing an image to be recorded. Digital video camera 100 in accordance with this embodiment reduces n out of focus even when object 401 moves from the position shown in FIG. 6A to the position shown in FIG. 6B during the main exposure operation. To achieve this reduction, camera 100 estimates a moving velocity of object 401 along the Z-axis during the preliminary exposure operation, and drives focus lens 113 to move during the main exposure operation based on the estimated moving velocity.

Figure 7:
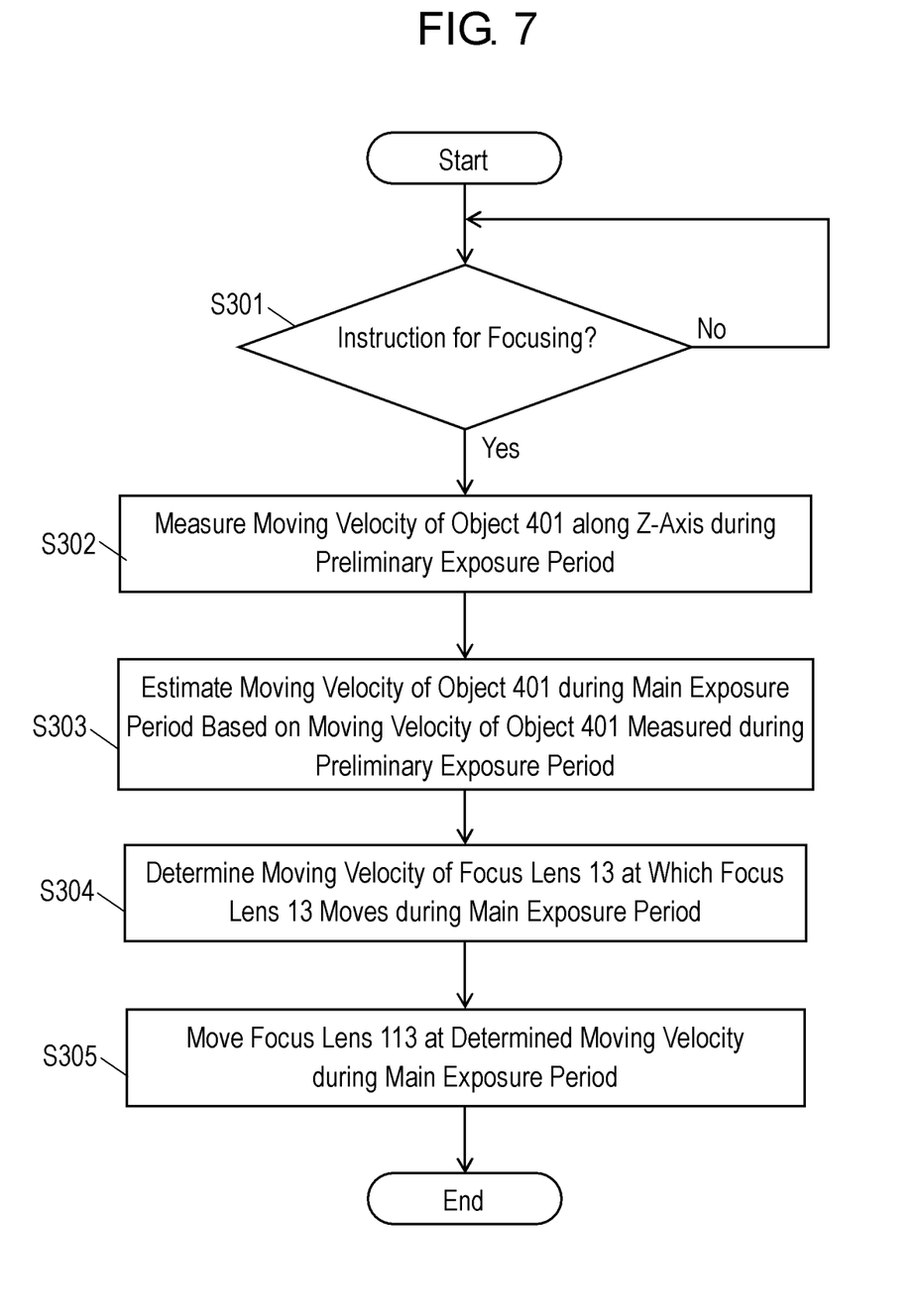
FIG. 7 is a flowchart of an operation of the digital video camera in accordance with the embodiment.
Figure 8:
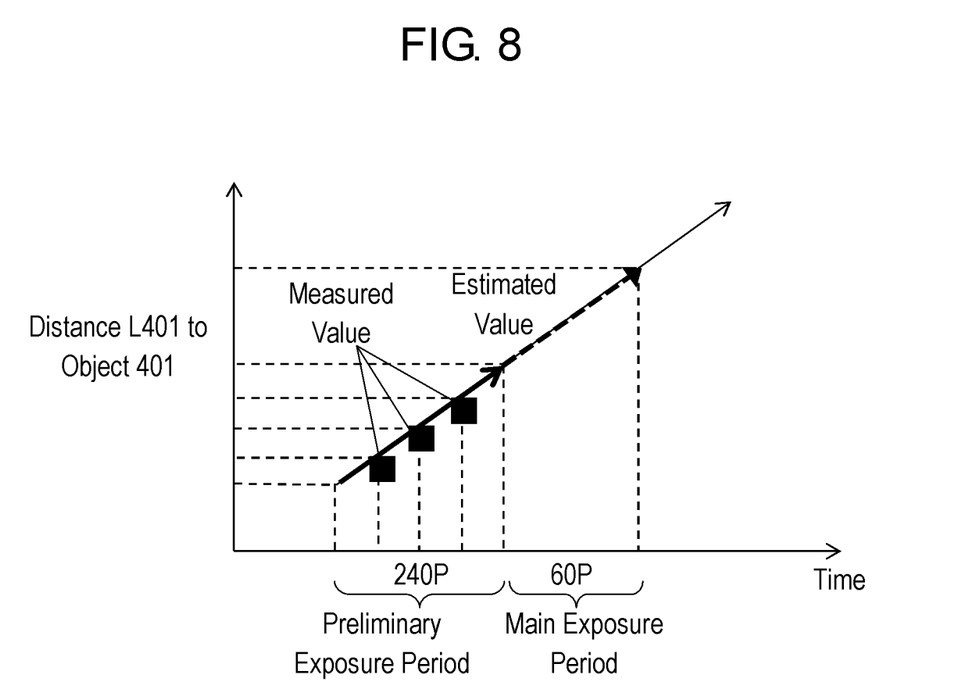
FIG. 8 is a schematic view of the digital video camera in accordance with the embodiment for illustrating an operation of the digital video camera.

FIG. 7 is a flowchart of an operation to determine a lens moving velocity (i.e. a moving velocity of focus lens 113) during the main exposure operation of digital video camera 100. FIG. 8 shows an operation of estimating the moving velocity of the focus lens during the main exposure operation. In FIG. 8, the horizontal axis represents time, and the vertical axis represents a distance to object 401 which is referred to as object distance L401). FIG. 8 shows that object 401 moves away from camera 100 along the positive direction of the Z-axis during the preliminary and main exposure operations.

Controller 180 monitors whether an instruction for focusing is provided or not (step S301). If the instruction for focusing is provided at step S301, controller 180 starts the preliminary exposure operation in which controller 180 causes CMOS image sensor 140 to capture object 401 at a high frame rate of, e.g. 240 p for performing the DFD calculation. Based on the result of the DFD calculation, controller 180 measures the moving velocity of object 401 along the Z-axis during the preliminary exposure operation (step S302). To be more specific, controller 180 moves focus lens 113 repetitively at intervals of $\frac{1}{240}$ seconds while performing the DFD calculation based on the object images. Controller 180 thus detects a moving distance of object 401 along the Z-axis during the period of $\frac{1}{240}$ seconds, so that controller 180 can calculate the moving velocity of object 401 along the Z-axis during the preliminary exposure period. Controller 180 repeats the DFD calculations several times at the high frame rate of 240 p during the preliminary exposure period for accurately calculating the moving velocity of object 401 along the Z-axis.

Next, based on the moving velocity of object 401 along the Z-axis which has been obtained by the preliminary exposure operation, controller 180 estimates a moving velocity of object 401 along the Z-axis during the main exposure operation which is after the preliminary exposure operation (step S303). For instance, when object distance L401 changes by −12.5 cm during the period of $\frac{1}{240}$ seconds in the preliminary exposure operation, controller 180 calculates a moving velocity of object 401 of −3000 cm/sec along the Z-axis during the preliminary period. Based on this calculated moving velocity of object 401, controller 180 estimates that object 401 moves −3000 cm/sec along the Z-axis during the main exposure operation as well.

When the main exposure period of the main exposure operation is, for instance, $\frac{1}{60}$ second, controller 180 estimates that object 401 moves by −50 cm (=−3000 (cm/sec)× $\frac{1}{60}$ (sec)) during this period of $\frac{1}{60}$ sec.

Controller 180 then determines a control amount for controlling focus lens 113 based on the estimated moving velocity. Controller 180 moves focal position Pf at a moving velocity corresponding to the determined control amount during the main exposure period, and causes CMOS image sensor 140 to capture the object image. In digital video camera 100 in accordance with this embodiment, controller 180 moves focus lens 113 to move focal position Pf. In other words, the control amount of focus lens 113 is a lens moving velocity, namely, the moving velocity of focus lens 113. Based on the estimated moving distance of the object during the main exposure period of the main exposure operation, controller 180 determines the moving velocity of focus lens 113 (step S304). To be more specific, controller 180 refers to the zoom tracking curve, and obtains the position of focus lens 113 corresponding to object distance L401 when distance L401 changes.

Figure 9:
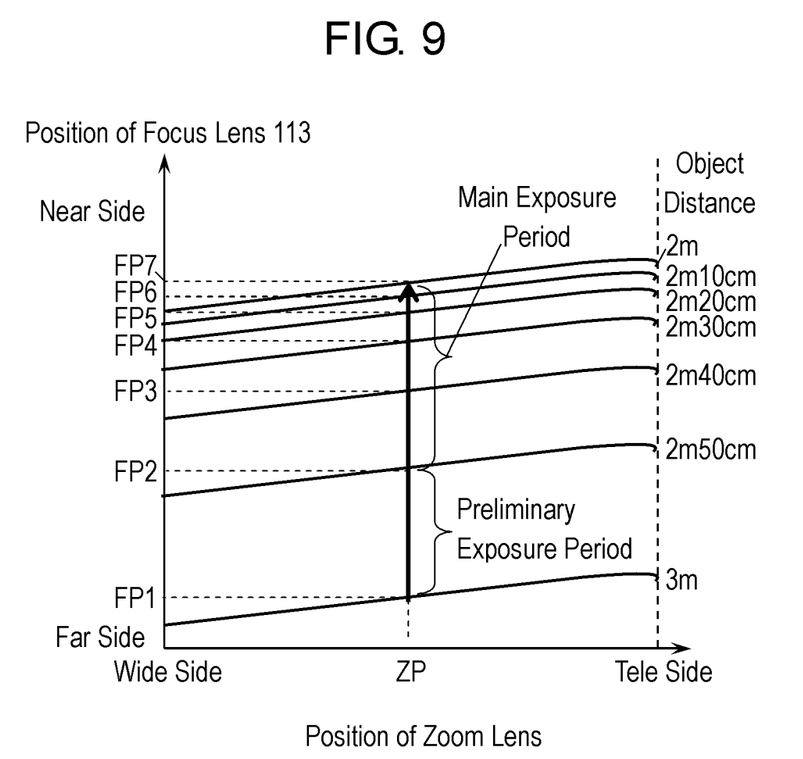
FIG. 9 is a zoom tracking table of the digital video camera in accordance with the embodiment.

FIG. 9 is a zoom tracking table to be referred to for determining the moving velocity of focus lens 113 during the main exposure period. For instance, when the preliminary exposure operation starts, namely, the preliminary exposure period starts, the object distance L401 is 3 meters, and when the preliminary exposure operation ends, namely, the preliminary exposure period ends, the object distance L401 changes to 2.5 meters. In this case, controller 180 estimates that the object moves by −50 cm (=−3000 cm/sec× 1/60 sec) during a period of 1/60 sec in the main exposure period of the main exposure operation. Controller 180 also estimates that object distance L401 is 2.0 meters (=2.5 meters−50 cm) at the end of the main exposure operation, namely, at the end of main exposure period. Controller 180 refers to the zoom tracking curve to obtaining a position of focus lens 113 corresponds to object distance L401. If controller 180 can obtain the position of focus lens 113 corresponding to object distance L401 within a range from 2.5 to 2.0 meters based on the zoom tracking curve, controller 180 obtains appropriately the position of focus lens 113 corresponding to the object distance L401 within this range. Assume that object distances L401 within the range from 2.5 to 2.0 meters are, for instance, 2.4 meters, 2.3 meters, 2.2 meters, and 2.1 meters, and then the positions of focus lens 113 corresponding to these object distances L401 can be obtained. Controller 180 then obtains positions FP3 to FP6 of focus lens 113. Since controller 180 estimates the moving velocity of object 401 during the main exposure period as −3000 cm/sec, controller 180 can calculate a time necessary for object 401 to move from the position of object distance L401 (=2.5 meters) at which the preliminary exposure period ends, to an intermediate position of L401 (=2.4 meters) as 1/300 sec. Similarly, controller 180 can also calculate a time necessary for object 401 to move from the intermediate position of object distance L401 (=2.4 meters) to another intermediate position of L401 (=2.3 meters) as 1/300 sec. Necessary times between other intermediate positions, such as from L401 (=2.4 meters) to L401 (=2.3 meters), can be also calculated as 1/300 sec. Referring to the zoom tracking curve, controller 180 obtains the position of focus lens 113 at each intermediate position, so that controller 180 can calculate the moving velocity of focus lens 113 moving between the intermediate positions.

Based on the calculated moving velocity of focus lens 113, controller 180 drives focus lens 113 to move during the main exposure period (step S305). The mechanism discussed above allows CMOS image sensor 140 to expose and capture the object image with object 401 in focus even when object 401 moves along the Z-axis during the main exposure operation.

3. Advantages

As described above, digital video camera 100, an image-capturing apparatus, captures an image of an object. Digital video camera 100 includes focus 113 lens that forms an object image of object 401 and has focal position Pf, CMOS image sensor 140 that produces image data by capturing the object image, and controller 180 that controls focus lens 113.

Controller 180 is operable to detect a change of a distance from digital video camera 100 to object 401 during a preliminary exposure period (a first exposure period) based on image data produced by capturing the object image with CMOS image sensor 140 during the preliminary exposure period. Controller 180 is operable to determine, based on the detected change of the distance, a control amount which controls a moving velocity at which focal position Pf moves during a main exposure period (a second exposure period) after the preliminary exposure period. Controller 180 is operable to move focal position Pf at a moving velocity corresponding to the determined control amount, and cause COMS image sensor 140 to capture the object image during the main exposure period.

The control amount may be a lens moving velocity at which focus lens 113 moves. In this case, controller 180 is operable to move focus lens 113 at the lens moving velocity during the second exposure period as to move focal position Pf.

As discussed above, the imaging apparatus, namely digital video camera 100, in accordance with the embodiment includes focus lens 113, CMOS image sensor 140 that captures an object image produced through focus lens 113 to produce image data, and controller 180 that detects a change of the object distance that is indicated by the object image. Before starting the capturing operation, controller 180 sets the preliminary exposure period and the main exposure period after the preliminary exposure period. Based on the detected change of the distance during the preliminary exposure period, controller 180 determines a moving speed of focus lens 113 for the final exposure period. Controller 180 then moves focus lens 113 at the determined moving speed. This operation allows the object image to be exposed with the in-focus state being maintained even if the object moves along the Z-axis during the main exposing action.

CMOS image sensor 140 produces the image data during the main exposure period. Controller 180 produces photographic data based on the image data, and stores the photographic data in memory card 200.

The lens moving velocity may include a moving amount and a moving direction of focus lens 113.

Controller 180 is operable to record, in a recording medium, photographic data based on image data produced by capturing the object image with CMOS image sensor 140 during the main exposure period.

Digital video camera 100 may further includes image processor 160 that produces distance data corresponding to the distance repetitively at predetermined intervals. In this case, controller 180 is operable to detect the change of the distance object 401 based on the distance data produced repetitively at the predetermined intervals.

Controller 180 is operable to cause CMOS image sensor 140 to produce first image data and second image data by capturing the object image when focus lens 113 is located at a first position and a second position, respectively. Image processor 160 is operable to produce the distance data based on the first image data and the second image data.

Image processor 160 is operable to calculate a defocusing amount based on the first image data and the second image data, and produce the distance data based on the calculated defocusing amount.

4. Other Embodiments

In the above embodiment, an example of a technique disclosed in this patent application is described; however, the technique disclosed in this application is not limited to the above embodiment and is applicable to other embodiments with a change, replacement, supplement, or omission.

The structural elements described in the embodiment can be combined for establishing a new embodiment.

An example of embodiments will be described below.

In the operation illustrated in FIG. 8, object 401 moves away from digital video camera 100 along the Z-axis during the preliminary and main exposure periods; however, the present invention is not limited to them. Namely, object 401 can approach camera 100 along the Z-axis during the preliminary and main exposure periods. In this case, the same advantage as discussed previously is obtainable.

In the above operation, controller 180 estimates the moving velocity of object 401 at which object 401 moves during the main exposure period under the assumption that the moving velocity of object 401 during the main exposure period is equal to the moving velocity thereof during the preliminary exposure period; however, the present invention is not limited to this estimation. For instance, controller 180 may estimate the moving velocity of object 401 at which object 401 moves during the main exposure period under the assumption that a moving acceleration of object 401 during the preliminary exposure period is equal to a moving acceleration thereof during the main exposure period, so that controller 180 can estimate the position and the moving velocity of object 401 at which object 401 moves during the main exposure period based on the acceleration.

In the above operation, controller 180 moves focus lens 113 during the main exposure period; however the present invention is not limited to it. For instance, during the main exposure period, controller 180 can move zoom lens 111 simultaneously and synchronously to focus lens 113. In this case, controller 180 can move zoom lens 111 to maintain the magnification of object 401 moving along the Z-axis. This operation allows CMOS image sensor 140 to capture the object image with object 401 being kept in-focus and the magnification of object 401 being maintained.

In the above operation, the control amount is the moving velocity of focus lens 113. In the case that focal position Pf moves by a method other than moving the focus lens 113, for instance, in the case that focal position Pf is moved by changing a shape, such as a thickness, of focus lens 113, the control amount is the shape or the thickness of focus lens 113. In this case, controller 180 moves focal position Pf by changing the shape or the thickness of focus lens 113 during the main exposure period.

According to the above embodiment, the point spread functions are stored in internal memory 240; however, the present invention is not limited to this structure, for instance, the point spread functions may be stored in a memory of image processor 160. Digital video camera 100 in accordance with the above embodiment selects sixteen point spread functions; however, the number of the selected point spread functions may be larger than sixteen or smaller than sixteen in response to the number of levels of the depth map.

The image-capturing apparatus in accordance with the above embodiment is a digital video camera. The lens of this camera cannot be replaced; however, the camera is not limited to this structure, and the present invention is applicable to a digital video camera with a replaceable lens.

In the above embodiment, examples of the technique disclosed in the present invention are described with accompanying drawings and detailed descriptions. The structural elements in the drawings or the detailed descriptions include not only elements essential for problems to be solved but also other elements necessary for detailing the examples but not necessary for solving the problems. Although these elements not necessary for solving the problems are described here, they should not be construed as essential elements for the problems to be solved.

The above embodiments only describe examples of the technique disclosed in the present invention, so that various changes, replacements, supplements, or omissions are allowed in the scope of claims described later or an equivalent scope thereto.

The image-capturing apparatus according to the present disclosure is applicable to digital video cameras, digital still cameras, portable-phones with camera function, or smart-phones with a camera function.

What is claimed is:

1. An image-capturing apparatus that captures an image of an object, the image-capturing apparatus comprising:
   a focus lens that forms an object image of the object, the focus lens having a focal position;
   an image sensor that produces image data by capturing the object image; and
   a controller that controls the focus lens,
   wherein the controller is operable to
      detect a change of a distance from the image-capturing apparatus to the object during a first exposure period based on image data produced by capturing the object image with the image sensor during the first exposure period,
      determine, based on the detected change of the distance, a control amount which controls a moving velocity at which the focal position moves during a second exposure period after the first exposure period, and
      move the focal position at a moving velocity corresponding to the determined control amount during the second exposure period, and cause the image sensor to capture the object image during the second exposure period while the focal position is moving at the moving velocity.

2. The image-capturing apparatus according to claim 1, wherein the control amount is a lens moving velocity at which the focus lens moves, and
   wherein the controller is operable to move the focus lens at the lens moving velocity during the second exposure period so as to move the focal position.

3. The image-capturing apparatus according to claim 2, wherein the lens moving velocity includes a moving amount and a moving direction of the focus lens.

4. The image-capturing apparatus according to claim 1, wherein the controller is operable to record, in a recording medium, photographic data based on image data produced by capturing the object image with the image sensor during the second exposure period.

5. The image-capturing apparatus according to claim 1, further comprising
   an image processor that produces distance data corresponding to the distance repetitively at predetermined intervals,
   wherein the controller is operable to detect the change of the distance to the object based on the distance data produced repetitively at the predetermined intervals.

6. The image-capturing apparatus according to claim 5, wherein the controller is operable to cause the image sensor to produce first image data and second image data by capturing the object image when the focus lens is located at a first position and a second position, respectively, and
   wherein the image processor is operable to produce the distance data based on the first image data and the second image data.

7. The image-capturing apparatus according to claim 6, wherein the image processor is operable to calculate a defocusing amount based on the first image data and the second image data, and produce the distance data based on the calculated defocusing amount.

8. An image-capturing apparatus that captures an image of an object, the image-capturing apparatus comprising:
    a focus lens that forms an object image of the object, the focus lens having a focal position;
    an image sensor that produces image data by capturing the object image; and
    a controller that controls the focus lens,
    wherein the controller is operable to
        determine, based on image data produced by capturing the object image with the image sensor during the first exposure period, a control amount, for the focus lens during a second exposure period after the first exposure period, which controls a moving velocity of the focal position, and
        move the focal position at a moving velocity corresponding to the determined control amount during the second exposure period, and cause the image sensor to capture the object image during the second exposure period while the focal position is moving at the moving velocity.

9. The image-capturing apparatus according to claim 8,
    wherein the control amount is a lens moving velocity at which the focus lens moves, and
    wherein the controller is operable to move the focus lens at the lens moving velocity during the second exposure period so as to move the focal position.

10. The image-capturing apparatus according to claim 9, wherein the lens moving velocity includes a moving amount and a moving direction of the focus lens.

11. The image-capturing apparatus according to claim 8, wherein the controller is operable to record, in a recording medium, photographic data based on image data produced by capturing the object image with the image sensor during the second exposure period.

* * * * *